United States Patent [19]

Clarke et al.

[11] Patent Number: 5,117,790
[45] Date of Patent: Jun. 2, 1992

[54] ENGINE OPERATION USING FULLY FLEXIBLE VALVE AND INJECTION EVENTS

[75] Inventors: John M. Clarke, Chillicothe; James J. Faletti, Spring Valley, both of Ill.

[73] Assignee: Caterpillar Inc., Peoria, Ill.

[21] Appl. No.: 656,653

[22] Filed: Feb. 19, 1991

[51] Int. Cl.⁵ .............................................. F02D 13/04
[52] U.S. Cl. ................................................... 123/321
[58] Field of Search ................... 123/90.11, 321, 64, 123/179 H, 568, 90.15, 179 B

[56] References Cited

U.S. PATENT DOCUMENTS

| | | | |
|---|---|---|---|
| 3,234,923 | 2/1966 | Fleck et al. | 123/90.11 |
| 3,501,099 | 3/1970 | Benson | 239/545 |
| 3,589,345 | 6/1971 | Benson | 123/90.11 |
| 3,786,792 | 1/1974 | Pelizzoni et al. | 123/90.13 |
| 3,927,652 | 12/1975 | O'Neill | 123/90.11 |
| 4,009,695 | 3/1977 | Ule | 123/90.13 |
| 4,011,474 | 3/1977 | O'Neill | 310/8.7 |
| 4,180,022 | 12/1979 | Khair et al. | 123/90.11 |
| 4,333,434 | 6/1982 | Bruanis et al. | 123/478 |
| 4,368,705 | 1/1983 | Stevenson et al. | 123/357 |
| 4,466,390 | 8/1984 | Babitzka et al. | 123/90.16 |
| 4,499,878 | 2/1985 | Ihashira et al. | 123/478 |
| 4,535,743 | 8/1985 | Igashira et al. | 123/472 |
| 4,592,319 | 6/1986 | Meistrick | 123/321 |
| 4,593,658 | 6/1986 | Moloney | 123/90.11 |
| 4,628,881 | 12/1986 | Beck et al. | 123/447 |
| 4,649,886 | 3/1987 | Igashira et al. | 123/498 |
| 4,730,585 | 3/1988 | Abe et al. | 123/300 |
| 4,785,784 | 11/1988 | Nanyoshi et al. | 123/478 |
| 4,794,890 | 1/1989 | Richeson, Jr. | 123/90.11 |
| 4,831,973 | 5/1989 | Richeson, Jr. | 123/90.11 |
| 4,917,058 | 6/1990 | Nelson et al. | 123/90.17 |
| 4,945,870 | 8/1990 | Richeson | 123/90.11 |
| 5,005,539 | 4/1991 | Kawamura | 123/90.11 |

FOREIGN PATENT DOCUMENTS

| | | | |
|---|---|---|---|
| 0324450 | 7/1989 | European Pat. Off. | 123/90.11 |
| 2213873 | 8/1989 | United Kingdom | 123/90.11 |

OTHER PUBLICATIONS

"Proposal for Magnavox Electronic Valve System", Published Nov. 15, 1988.

Primary Examiner—Raymond A. Nelli
Attorney, Agent, or Firm—Sterne, Kessler, Goldstein & Fox

[57] ABSTRACT

A system for controlling operational modes of an engine including valve and injection events, in which the engine comprises a plurality of cylinders having an intake and exhaust valve, an injector, a chamber and an intake and exhaust port. The plurality of cylinders are connected by an intake and exhaust manifold. The system comprises a cylinder control unit for independently governing an operational mode of each of the cylinders. The cylinder control unit comprises a valve control unit for controlling the operation of the intake and exhaust valves. The cylinder control unit also controls opening and closing of the intake and exhaust valves in accordance with the independently governed operational mode of each cylinder. The cylinder control unit further comprises an injector control unit for controlling the operation of the each of the injectors. The injector control unit controls fuel injection timing of each of the injectors, independently of the operation of the intake and exhaust valves. The cylinder control unit independently controls each of the cylinders to control the valve and injection events to achieve a plurality of operational modes for the engine.

13 Claims, 10 Drawing Sheets

ENGINE OPERATION USING FULLY FLEXIBLE VALVE AND INJECTION EVENTS

BACKGROUND OF THE INVENTION

1. Field of the Invention

The field of the invention relates generally to the control of operational modes of combustion engines. More particularly, the invention relates to control of an advanced concept engine (ACE) using flexible valve and injection events on a per cylinder basis.

2. Related Art

Control of internal combustion engines has received substantial attention in the past several decades. Compression and spark ignition engine designs have attempted to achieve increased flexibility of engine operation. A plethora of designs and patents have been directed to independent intake and exhaust valve actuation and electronic fuel injection. Many of these are directed to computers and feedback systems for controlling engine timing. Systems using independent valve actuation and electronic fuel injection have been conceived to perform engine operational modes not attainable by cam-based engines. However, the embodiments of the instant invention use fully flexible valve and injection events to achieve mixed mode engine operation by varying the order of events on a per cylinder basis.

The above systems that use independent valve actuation and electronic fuel injection employ several methods for valve and injector actuation. Electronically or computer controlled solenoids, electromagnetic transducers and piezoelectric stacks are used for direct actuation. Alternatively, solenoids, transducers and/or stacks are used to control hydraulic valves which in turn actuate cylinder valves and injectors. The opening and closing of valves and injectors in camless systems is typically controlled as a function of some engine parameter such as speed or angular position of the crankshaft.

One example of a dual exhaust valve actuation system is disclosed in GB 2213873A. Two electronically controlled electromagnetic valves are used to switch hydraulic pressure, which in turn acts against the valve springs for counter biasing of the valves. GB 2213873A discloses early exhaust valve opening in order to increase the energy supplied to the turbocharger and thereby reduce turbo lag. A common technique for engine braking is also discussed in GB 2213873A. The exhaust valves are opened at top dead center to prevent energy recovery during the downward stroke of the engine. Moreover, operation of a four stroke engine in two stroke mode is believed to enhance engine braking.

Independent opening and closing of intake and exhaust valves is disclosed in U.S. Pat. No. 4,009,695 to Ule. Ule discloses four hydraulic actuation embodiments. One embodiment describes a pair of rotary hydraulic controlled valves which permit independent timing of intake and exhaust valves. However, as in conventional cam driven valve engines, Ule's system repeats the sequence or order of cylinder firing events for each like valve. Although the ordering of cylinder events are the same for each cylinder, Ule's system provides adaptable timing of intake and exhaust opening and closing. Ule further teaches control of cylinder charge volume by delayed closing of the intake valves. Ule attempts to minimize hydrocarbon emissions due to misfiring by preventing the formation of an intake vacuum.

A bistable electromechanical transducer is taught in U.S. Pat. No. 4,794,890 to Richeson. Richeson's device includes a moving armature controlled by a latching permanent magnet and an electromagnetic repulsion unit for slowing valve motion near extreme valve-open and valve-closed positions. The device is designed for rapid valve opening and closing, i.e., short transition times between stable states. Like other camless systems, the actuation is independent of the engine speed. The valve timing, which is the point within the cycle when opening and closing starts, is also selectable.

The Richeson patent addresses various operational advantages due to electronic control of the electromechanical valve actuator. Exposure of the cylinders to the atmosphere during nonuse is prevented by closing all valves. A cold weather starting sequence begins with the exhaust valves closed and the intake valves open for compressionless cranking until a suitable speed is reached for starting. Spark ignition engine deceleration is accomplished by turning off cylinders by closing selected valves. Engine braking is done by changing valve timing to operate in a compression mode, as discussed above.

Examples of piezoelectric valve actuators are shown in U.S. Pat. Nos. 4,466,390 to Babitzka et al. and 4,593,658 to Moloney. Babitzka et al. disclose the addition of a piezoelectric stack to a cam driven valve. The stack is coupled with a hydraulic system to achieve shortened valve-open time modes. The Moloney patent is directed to a camless system which uses a piezoelectric stack coupled to an amplifying lever arm for direct actuation of a valve.

U.S. Pat. No. 3,589,345 to Benson, U.S. Pat. Nos. 4,499,878 and 4,649,886 to Igashira et al. U.S. Pat. No. 3,927,652 to O'Neill, U.S. Pat. No. 4,180,022 to Khair et al. and U.S. Pat. No. 4,730,585 to Abe et al. teach piezoelectric stack actuated fuel injectors.

SUMMARY OF THE INVENTION

The instant invention is directed to a system for controlling a plurality of operational modes of an engine including valve and injection events, in which the engine comprises a plurality of cylinders having an intake and exhaust valve, an injector, a chamber and an intake and exhaust port, wherein the plurality of cylinders are connected by an intake and exhaust manifold.

The system comprises cylinder control means for governing an operational mode of each of the cylinders independently. The cylinder control unit comprises valve control means for controlling the operation of the intake and exhaust valves. The cylinder control unit is for controlling opening and closing of the intake and exhaust valves in accordance with the independently governed operational mode of each cylinder.

The cylinder control unit also comprises injector control means for controlling the operation of each of the injectors. The injector control means controls fuel injection timing of each of the injectors, independently of the operation of the intake and exhaust valves.

The cylinder control means independently controls each of the cylinders to control the valve and injection events to achieve a plurality of operational modes for the engine.

BRIEF DESCRIPTION OF THE DRAWINGS

The invention will be better understood if reference is made to the accompanying drawings in which.

DETAILED DESCRIPTION OF THE PREFERRED EMBODIMENTS

Figure 1:
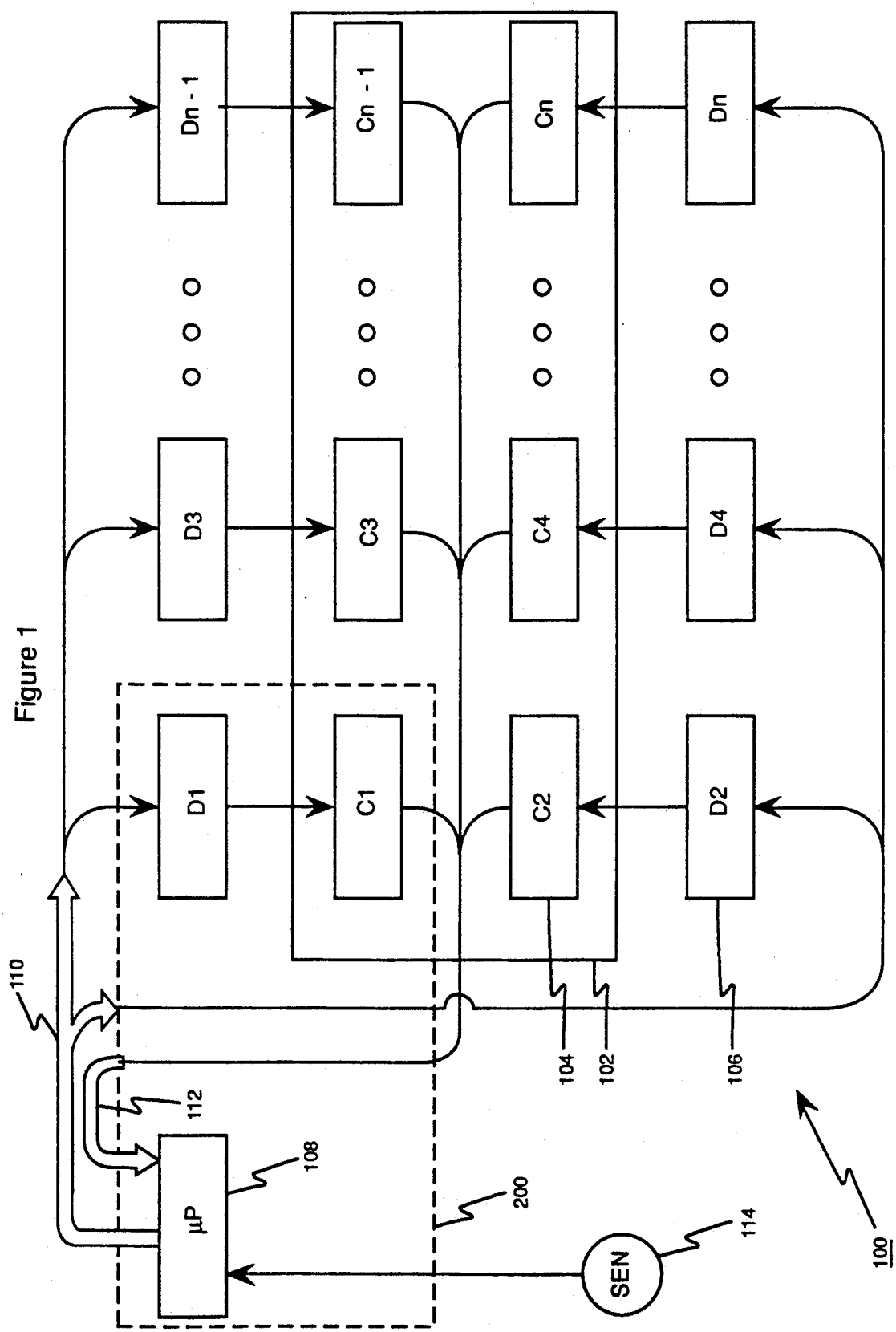
FIG. 1 is a high level block diagram representing a control system for an ACE engine in connection with an embodiment of the present invention.

Operating modes of an advanced concept engine (ACE engine) employ fully flexible valve and injection events on a per cylinder basis. Thus, the ordering of valve and injection events is different from one cylinder, or group of cylinders, to the next. Methods of engine operation in connection with embodiments of the instant invention have distinct performance and emissions advantages over conventional internal combustion engine cycles.

The ACE engine control system and method achieves complete flexibility in fuel injection timing and quantity. Moreover, the ACE engine control system and method permit fully independent inlet and exhaust valve opening and closing.

The combination of the above noted advantages yields independent control of each cylinder's mode of operation in a multi-cylinder, spark or compression internal combustion engine. The ordering of cylinder events may be different for separate groups of cylinders, or on a per cylinder basis.

The above effects can be controlled over an ACE engine's complete speed and torque ranges to achieve different mixed modes of engine operation as well. Control and optimization of power output is realizable on a per cylinder basis. Flexible timing facilitates improved engine braking capabilities. Faster upshifts can be achieved using the braking mode of the engine. Furthermore, the ACE engine control system and method uncomplicates split injection to reduce engine stress and noise.

Optimized part load is used to minimize fuel consumption for a given output by varying the load on particular cylinders. This includes shutting valves off. The added control facilitates smoother transition during cylinder and valve switching.

Single or multi-cylinder modified intake closing of an engine is also attained by closing either well before or after the piston reaches its extreme position at the end of the intake stroke. Modified intake closing can achieve a variable engine compression ratio through a reduction of the effective induction and compression strokes of the engine. This technique can compensate for extremely high cylinder pressure caused, for example, by high turbo boost which may occur on cold days at low altitude.

The ACE engine control system and method permit any number of cylinders to operate as a positive displacement pump. Intake valve(s) may be opened to draw air in through the intake port(s) during the induction stroke. The intake valve(s) are then closed, and the exhaust valve(s) are opened during the compression stroke to pump air through the exhaust port(s). Displacement pumping can be used in either 2- or 4-stroke operation of a 4-stroke engine, depending on pumping requirements.

A novel starting sequence is also an important feature of the ACE engine control system and method.

First, all cylinders are placed in a low work mode (i.e., no compression), therefore, a small starter motor can be used to crank the engine with low initial torque; perhaps with all valves shut, or in pump mode.

Second, most of the cylinders are switched into a low drag mode to inhibit air flow into the corresponding chambers through the intake ports (i.e., exhaust breathing mode).

Third, the remaining cylinder, or possibly a few cylinders, are switched into an air heating mode to heat air in the corresponding intake manifolds. This will also heat the cylinder's chamber. This air heating mode discharges compressed air back into the intake manifolds, by opening of the intake valves near the end of compression. The heated chamber(s) is then switched into normal operating mode with fuel.

Fourth, the other cylinders are switched into motoring mode to increase drag. Then the amount of fuel injected into the operating cylinders is increased to force strong heating.

Finally, the cylinders that were originally placed in the low work mode are brought on line sequentially.

Fast ACE engine response is achieved by switching a first plurality of cylinders to a braking mode to absorb power. This technique can nullify turbo lag. Then, a second plurality of cylinders are switched to a high load to compensate, and thus, increase exhaust temperature. The added energy in the exhaust increases the boost pressure of the turbocharger. An instantaneous supply of turbocharged air (high quantity) is thus available at any time to supply the first plurality of cylinders in the event they are switched to a load mode.

A structure for the ACE engine in connection with an embodiment of the present invention is shown in FIG. 1 at block diagram 100. An engine head, shown generally at 102, comprises cylinders 104 numbered C1-Cn, respectively. Operational modes of the control system are applicable to internal combustion engines of two or more cylinders. Each of the cylinders C1-Cn are shown connected to drivers 106 numbered D1-Dn. Drivers 106 are individually or jointly controlled by a microprocessor 108 via an output on a control bus 110.

A cylinder feedback bus 112 is provided to permit signals to be fed back directly to the microprocessor 108. Additional engine sensors 114 may also be provided to supply further data to the microprocessor 108 relating to thermodynamic and electromagnetic conditions of the engine and its components.

Operational modes of the control system have direct application to diesel engines such as the Caterpillar Inc. model 3176 or any compression or spark ignition internal combustion engine.

The microprocessor 108 provides computer control for the engine 102. However, the specifics of the hardware and software for implementing the computer control of the operational modes are not necessary to carry out embodiments in connection with the instant invention. Such specifics will become apparent to those of ordinary skill in the art. The conventional computer controlled systems set forth in the above section in conjunction with standard programming are also sufficient to carry out the operational modes in connection with embodiments of the instant invention.

Figure 2:
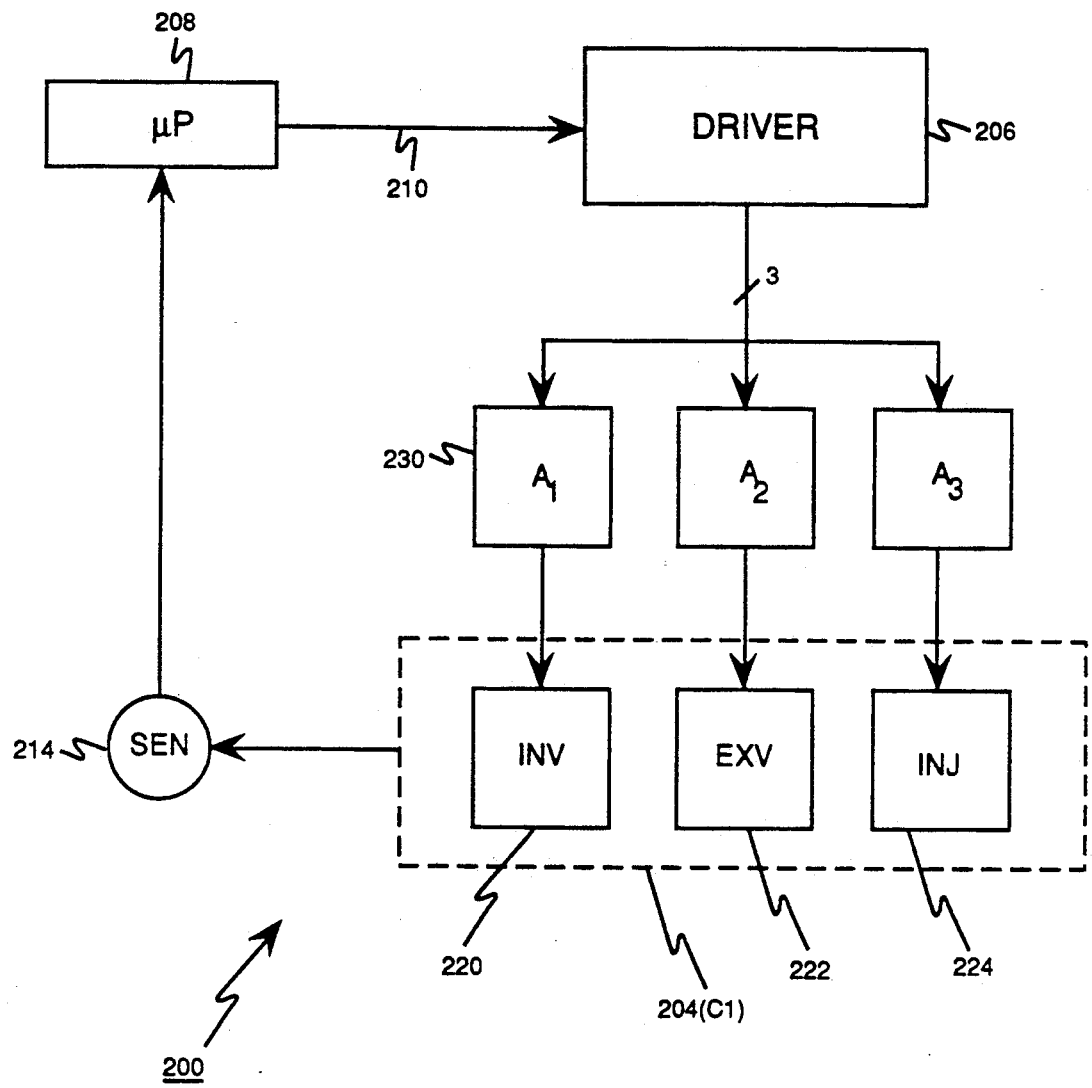
FIG. 2 is a block diagram representing a control system for a single cylinder of an ACE engine in connection with an embodiment of the present invention.

The block diagram 200 at FIG. 2 shows a more detailed representation of a cylinder Cl. The cylinder 204 includes an intake valve 220, an exhaust valve 222 and an injector 224. Only a single exhaust value and injector are shown. However, it will become apparent to those skilled in the art that variations on the structure may be substituted. Three actuators A1-A3 are shown generally at FIG. 2 (see numeral 230). The actuators A1-A3 are powered by a driver 206 under the control of a microprocessor 208. Data feedback to the microprocessor 208 is shown as a single sensor at 214, but may take the form of other readily apparent structures.

Computer control of ACE engine operation is based on many factors. Specific engine structure, vehicle configuration and function, and engine variables such as cylinder pressure, exhaust temperature, crank shaft speed, angle and torque are several examples. These and other variables can be monitored by commonly available electromagnetic and semiconductor sensors. The sensors provide the raw data to the microprocessor which then processes the data along with programmed information to determine proper timing of cylinder events such as intake and exhaust value actuation and fuel injection. The microprocessor 208 generates signals for transmission over an output control bus 210 to the driver 206. The driver 206 in turn provides the necessary commands, signals or power to the actuators 230 for control of cylinder events.

The operational modes in connection with embodiments of the instant invention require that each cylinder's intake valve, exhaust valve, and injector be individually controllable. The ordering of cycle events for each cylinder is independently controllable on a per cylinder basis. To achieve independent control, the actuators 230 may comprise electromechanical, hydraulic, or piezoelectric devices to provide valves and injector actuation. The actuator devices 230 may require different power and/or signals and systems depending on the specific device employed. The driver 206 is shown as a single box only, by way of example.

Figure 3:
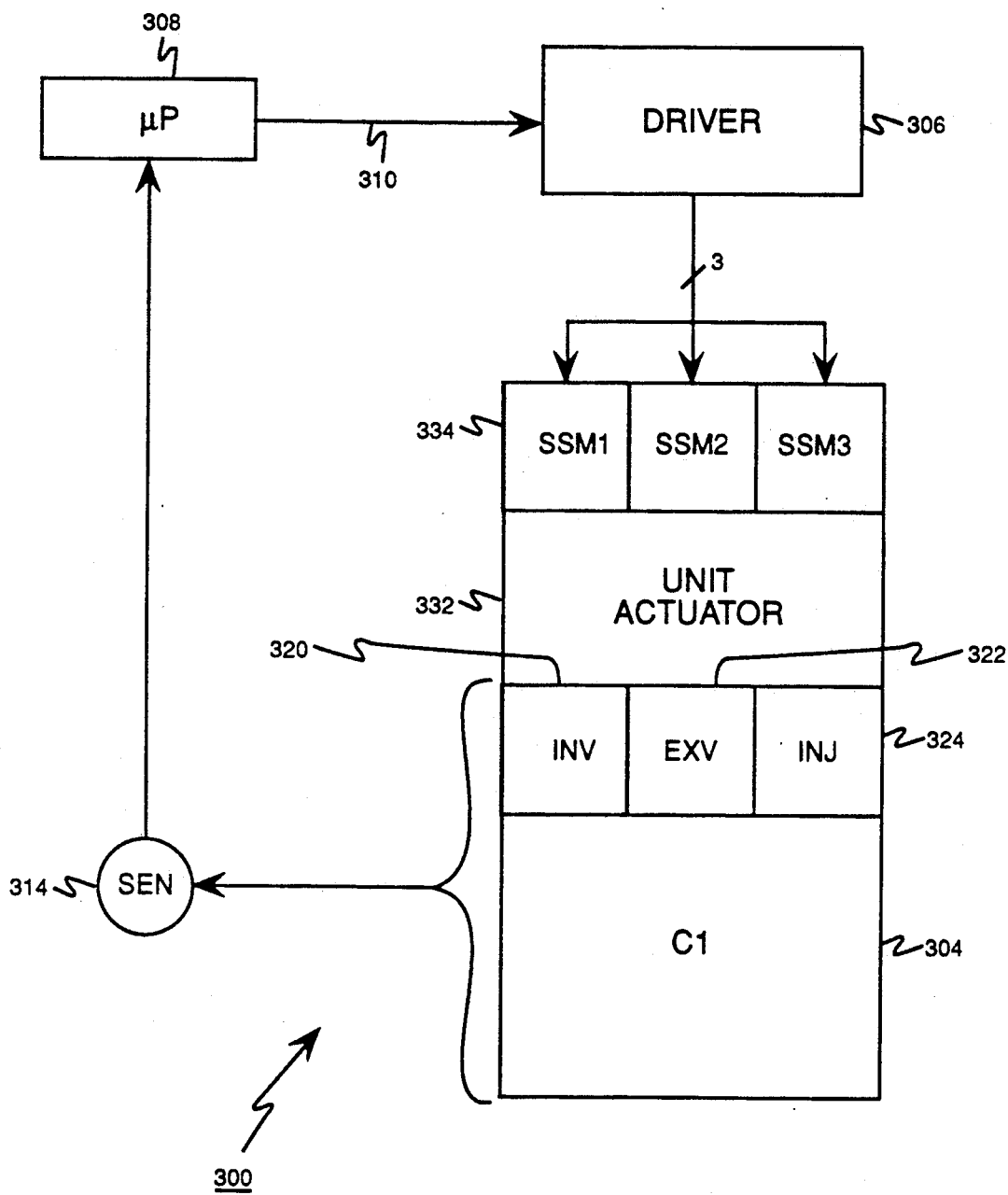
FIG. 3 shows a preferred embodiment of a control system for a single cylinder of an ACE engine in connection with an embodiment of the present invention.

A preferred structure for carrying out the operational modes in connection with embodiments of the instant invention is shown in FIG. 3. Actuation of the cylinder's (304) intake valve 320, exhaust valve 322, and injector 324 is performed by a single unit actuator 332. The actuator 332 comprises three solid state motor piezoelectric stacks 334. The powering of the solid state motors 334 is done by the driver 306 under control of the microprocessor 308. Data on cylinder operation and performance is provided to the microprocessor 308 via the sensors 314 as discussed above.

Figure 4:
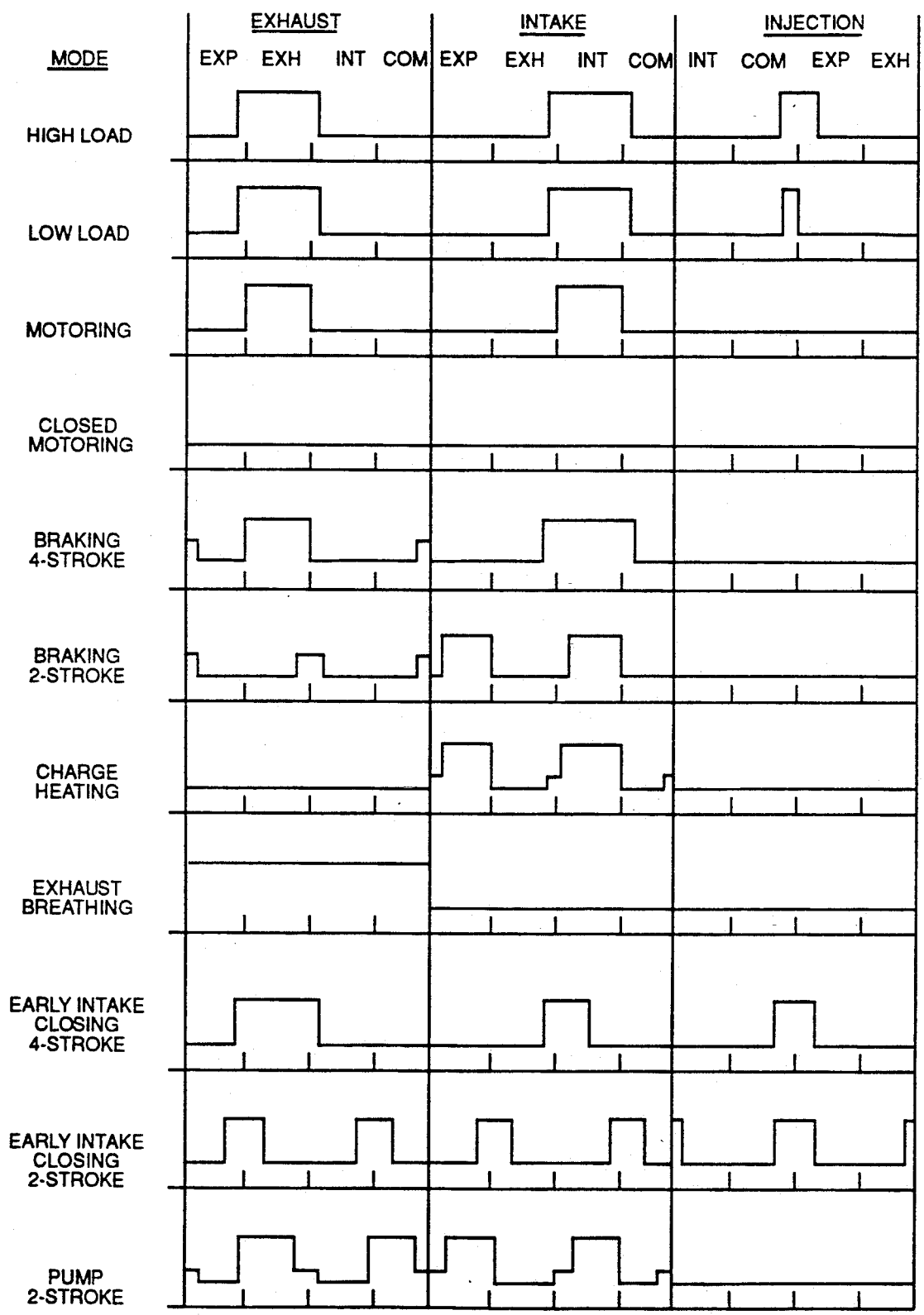
FIG. 4 is a table representing exhaust, intake and injection events for various operational modes in connection with an embodiment of the present invention.

Several modes of operation in conjunction with the control system are shown at FIG. 4. The mode's name is found along the left hand column. Cylinder events for the exhaust valve, intake valve and injector are shown on the right. Four cycle events are shown under each of the three headings. The conventional labelling of the strokes has been adopted. The abbreviation "Exp" represents the expansion stroke. The abbreviation "Exh" represents the exhaust stroke. The "I" and "COM" represent the injection and compression strokes, respectively.

Conventional high and low load operating modes are shown at the top of the figure. In both high and low load modes, the exhaust valve is open during the exhaust stroke and the intake valve is open during the intake stroke. The high and low load modes differ in the amount of injection during the transition between the compression and expansion strokes.

A conventional motoring mode is shown with actuation of both the exhaust and intake valves, and no fuel injection. Both exhaust and intake valves are closed during the closed motoring mode. As with the motoring mode, no injection takes places during the closed motoring mode.

Two braking modes are also shown in FIG. 4. In four-stroke braking mode, the exhaust valve is partially open during the transition between the compression and expansion strokes and is fully open during the exhaust stroke; the intake valve is open during the intake stroke. There is no fuel injection during four stroke or two-stroke braking mode. In two-stroke braking mode, the exhaust valve is partially open during stroke transition and is fully opened during the intake strokes.

The charge heating operating mode can be conducted either in four or two-stroke mode. Four-stroke charge heating is shown in FIG. 4. During four-stroke charge heating, the exhaust valve is closed and there is no fuel injection. The intake valve is partially open for the transition of the compression and expansion strokes and is fully opened during the remainder of the expansion stroke. The intake is partially open at the beginning of the intake stroke and fully opened during the remainder of the intake stroke. For exhaust breathing, the exhaust valve is held open for all strokes, the intake valve is kept closed and there is no fuel injection.

Four-stroke and two-stroke early intake closing are also shown in FIG. 4. The intake valve is closed part way through the intake stroke. Since reduction of the induction stroke effectively reduces the compression stroke, the cylinder's compression ratio is lowered as well. Lowering the compression ratio permits the engine to be run at very high output against the cylinder pressure limits without having to initially set the engine to a very low built in compression ratio.

Figure 5:
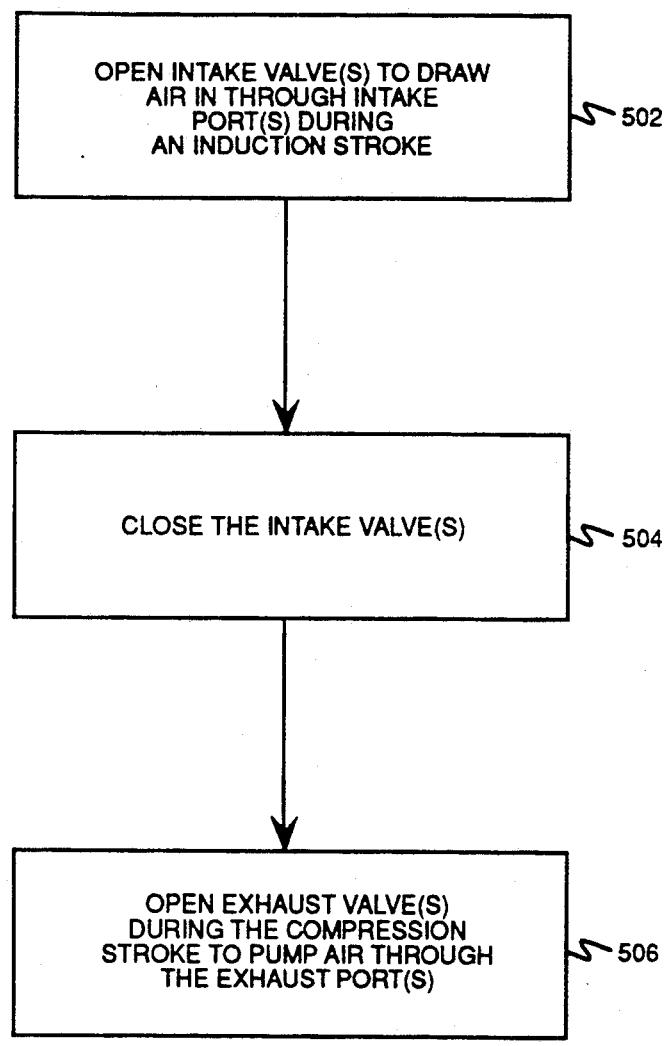
FIG. 5 is a flow chart depicting a positive displacement pump mode of operation in connection with an embodiment of the present invention.

A two-stroke positive displacement pump mode operation is shown at the bottom of FIG. 4. The corresponding flowchart is shown in FIG. 5. The operation of this mode is as follows: air is drawn into the cylinder during the intake stroke, as shown at block 502; next, the intake valve is closed; the exhaust valve is then opened, as shown at block 504; and the air is transferred to the exhaust manifold during the compression stroke, as shown at block 506.

In the positive displacement pump operational mode, one or more cylinders can be used to pump air. In this mode one half of the engine, or any number of cylinders can be used as an air pump. The pumped air may be vented and used for a variety of purposes. The positive displacement pump operational mode may be used to pump cargo such as powders or flour.

Figure 6:
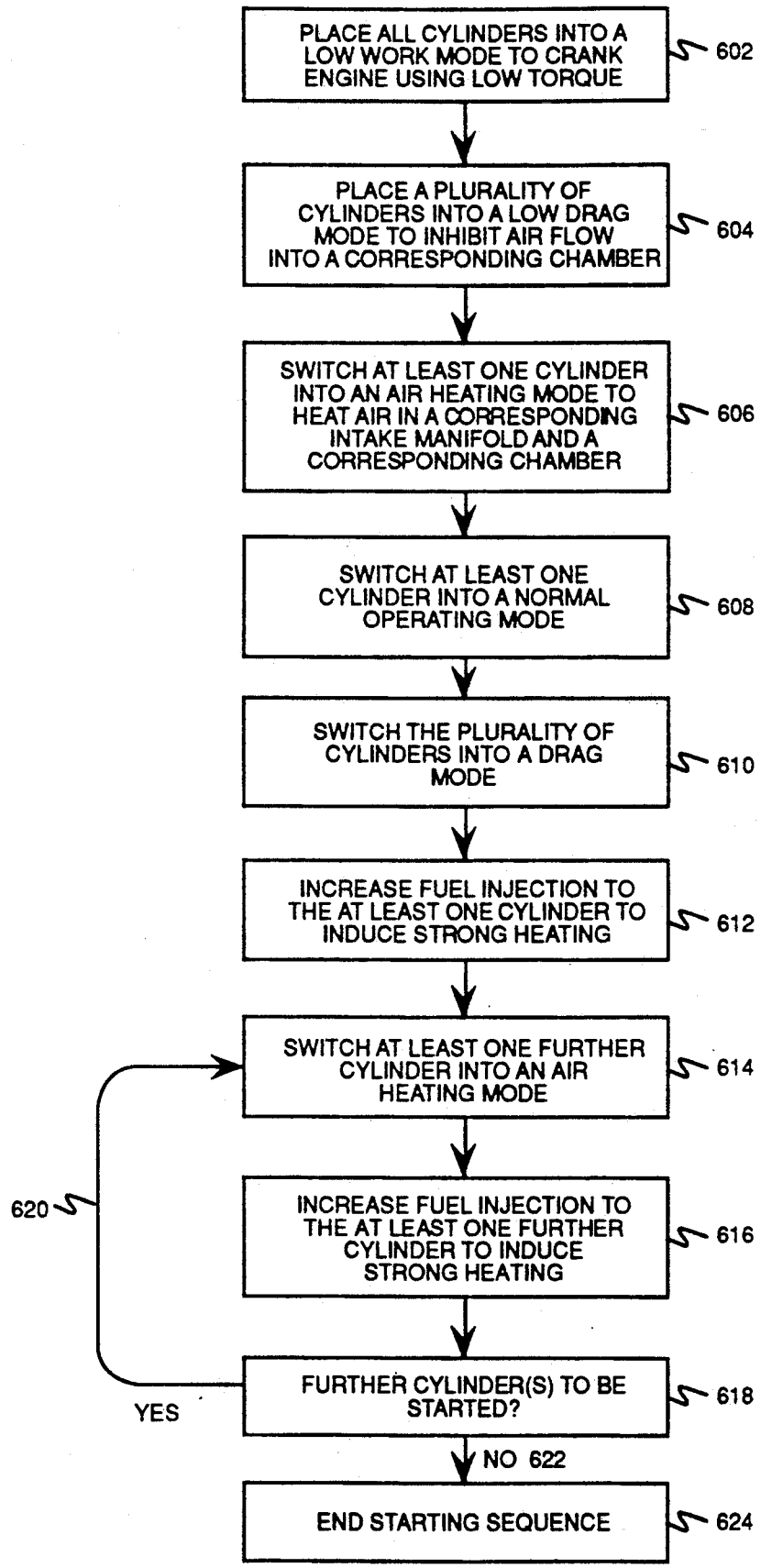
FIG. 6 is a flow chart depicting a starting sequence mode of operation in connection with an embodiment of the present invention.

A flowchart depicting a starting sequence mode of operation in connection with the instant invention is shown at FIG. 6. Diesel engines have two different starting problems. First, diesel engines have a very high compression ratio which makes cranking of the engine difficult. Second, it is difficult for diesel engines to reach sufficiently high temperatures for rapid ignition during cold weather. Emission problems such as the generation of white smoke during the starting sequence also results from poor firing during the starting sequence.

The starting sequence of the instant invention prevents fuel injection to cylinders that may not fire and ensures combustion for those that undergo injection. To begin the starting sequence, all cylinders are placed in a mode of operation, such as exhaust breathing mode or closed motoring mode, to permit cranking of the engine using low torque. A small starting motor may be employed.

Next, a plurality of cylinders are placed into a low drag mode to inhibit air flow into the corresponding chambers, as shown at block 604. The exhaust breathing mode discussed above would be appropriate for low drag. A single cylinder is then switched into an air heating mode to heat air in a corresponding intake manifold and corresponding chamber, as shown at 606. More than one cylinder may be switched into the air heating mode at this time. Engine temperature, ambient temperature and other operating conditions may affect the number of cylinders that are first switched into the air heating mode.

At least one cylinder is then switched into a normal operating mode with fuel once the cylinder's corresponding chamber is sufficiently heated. This switching is shown in block 608. A number of other cylinders can then be switched into motoring mode to increase engine drag, as shown at 610. The next step of this sequence is to induce strong heating in the loaded cylinders by increasing the amount of fuel injection. See block 612.

The starting sequence operational mode continues to bring further cylinders on line in a similar manner as discussed above. Hence, the cylinders that were originally placed in the low work mode are brought on line sequentially. For example, a next cylinder is placed in the air heating mode, as depicted at 614. Once this cylinder's chamber is sufficiently heated, it is put in normal operating mode and its fuel injection is increased to induce strong heating, as shown at 616.

A conditional statement is shown at 618 at which time the microprocessor must determine whether further cylinders need to be brought on line. Loop 620 represents the condition that further cylinders require starting. The sequence is halted at 624 when the microprocessor determines that the engine starting sequence operational mode is complete (see block 622).

Figure 7:
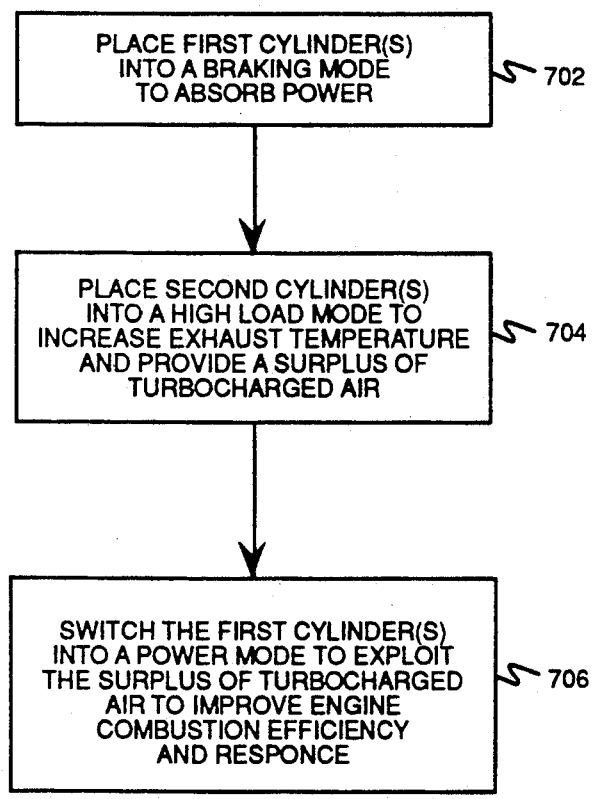
FIG. 7 is a flow chart depicting a method for improving ACE engine efficiency and response in connection with an embodiment of the present invention.

The ACE engine can be operated in a fast response mode to nullify turbo lag. This operational sequence is shown at FIG. 7.

A first plurality of cylinders are switched into the above-described braking mode to absorb power, as shown at block 702. Next, a second plurality of cylinders are switched to a high load mode to compensate for the braking mode of the first switched cylinders, and thus, increase exhaust temperature, as shown at 704.

The added energy in the exhaust increases the boost pressure of the turbo charger. A high quantity of surplus turbo charged air is then available at any time to supply the braking cylinders in the event that they are switched to a load mode. The power switching is shown at block 706.

The flexibility of the ACE engine control system can be adapted with built-in self-diagnostic capability by checking the behavior during specially designed testing procedures. The following are just a few examples of many possible diagnostic procedures.

Figure 8:
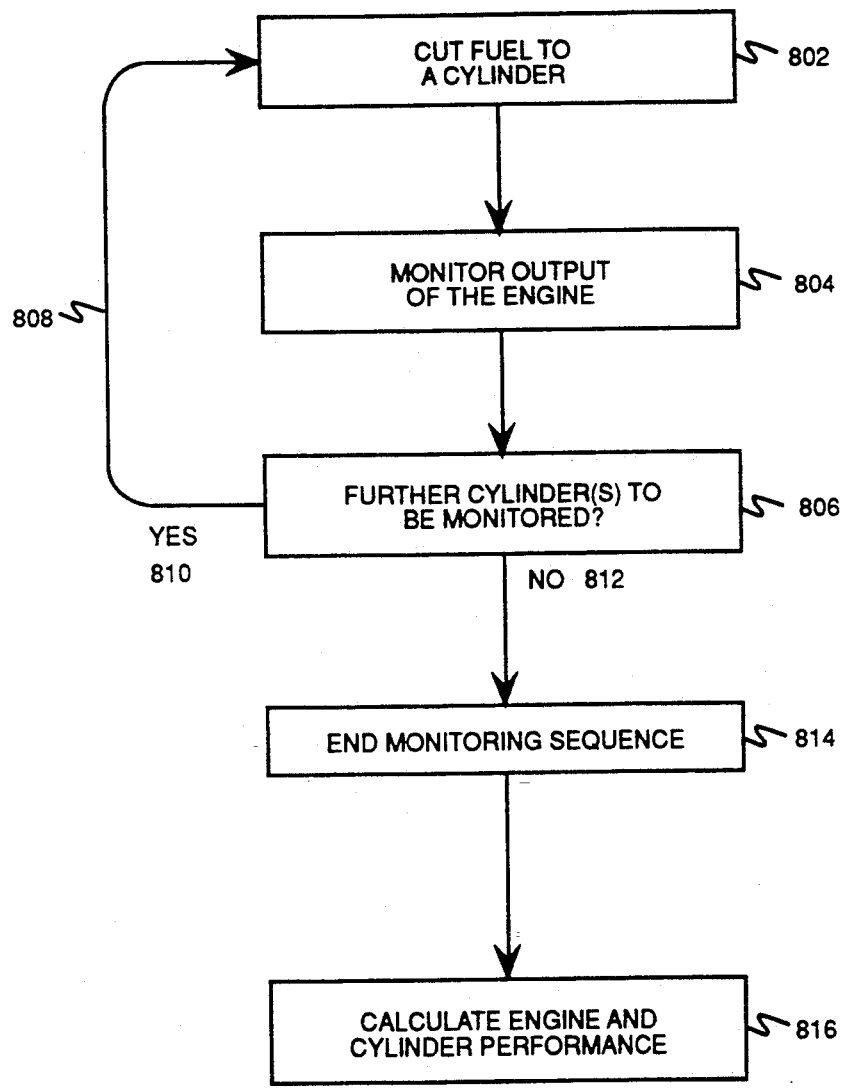
FIG. 8 is a flow chart depicting a method for determining cylinder and engine performance in connection with an embodiment of the present invention.

ACE engine and individual cylinder performance can be determined by the sequence shown in FIG. 8. First, fuel is cut to a cylinder, as shown at block 802. Engine output is then monitored (see block 804) while the remaining cylinders are kept in normal operating load mode. This test is then conducted for the remaining cylinders, as shown at the conditional statement in block 806.

The microprocessor enters loop 808 if further cylinders are to be tested. The monitoring sequence is halted (see block at 814) when the microprocessor determines that no further cylinder(s) are to be tested. (This is represented by the legend "NO" at 812.) The performance of a predetermined cylinder(s), as well as overall engine output, is determined at block 618.

Figure 9:
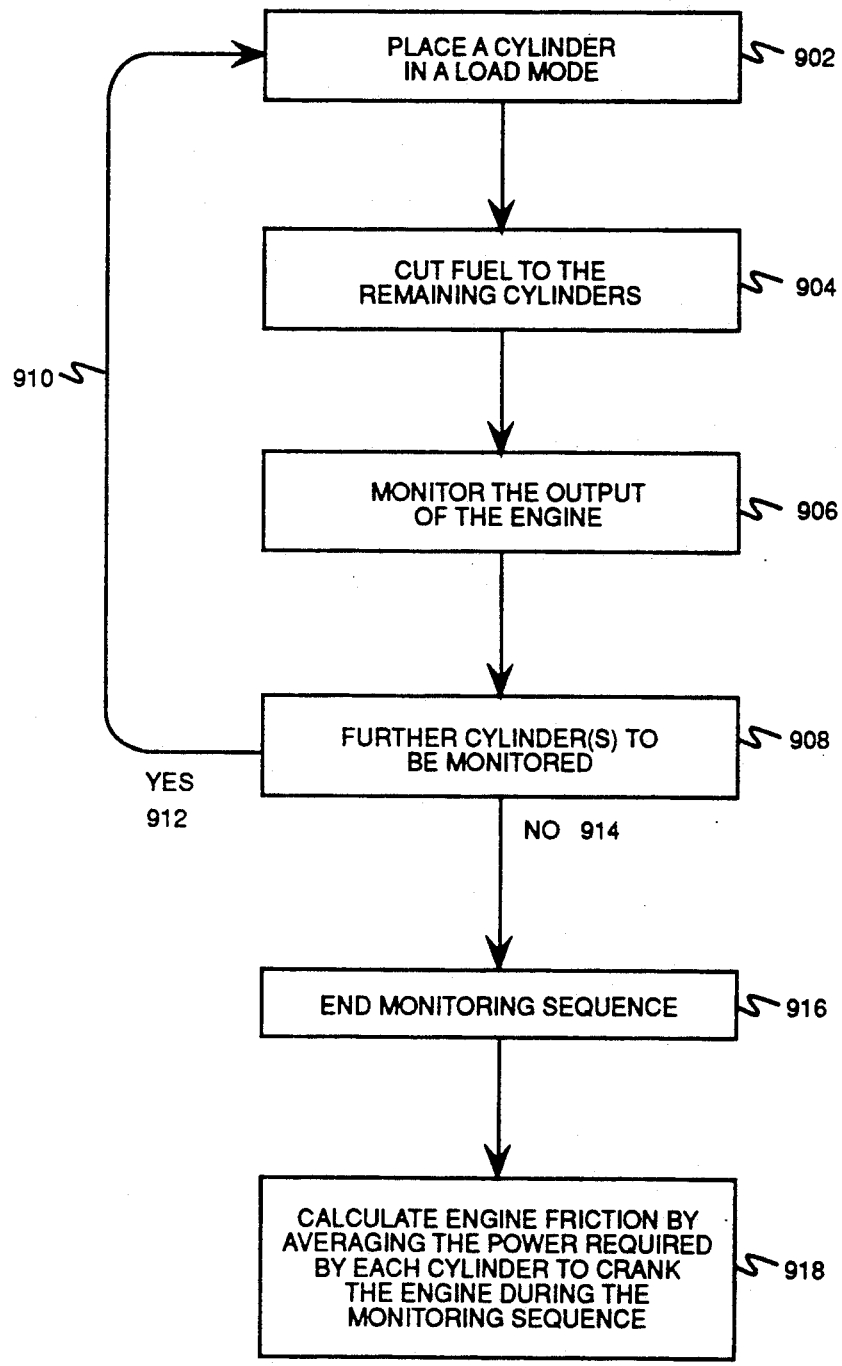
FIG. 9 is a flow chart depicting a method for determining engine and cylinder friction in connection with an embodiment of the present invention.

Another testing procedure is shown in FIG. 9. Engine friction can be determined by averaging the power required by each cylinder to crank the engine during the monitoring sequence. A first cylinder is placed in a load mode, as shown at block 902, while fuel is cut to the remaining cylinders (see block 904). The amount of power required to crank the engine is then monitored, as depicted at block 906. The microprocessor determines the remaining predetermined cylinder(s) for which the test is to be conducted at conditional statement 908. Loop 910 is entered by the microprocessor if it determines one or more cylinders are to be tested. The loop is exited (at block 914) when the microprocessor determines that the cylinder testing is complete and the process is halted at 916. Block 918 represents the calculations to be conducted by the microprocessor in determining engine friction.

The above diagnostics need not be limited to being performed on all cylinders, but may be applied to a single cylinder or to any group of cylinders. The microprocessor may determine when and on which cylinders these diagnostics are performed based on programming and/or sensor feedback. ACE engine diagnostics need not be limited to self testing but may be implemented by the operator or servicing personnel.

Figure 10A:
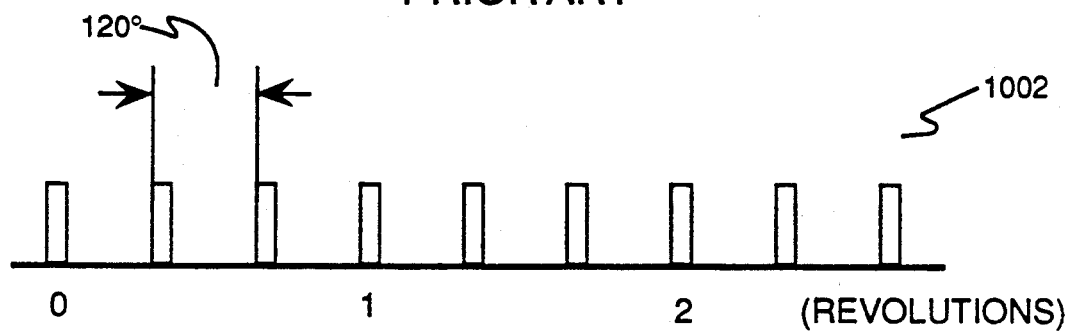
FIGS. 10 and 10b are a simultaneous firing mode of operation in connection with the present invention.

A simultaneous firing mode (SFM) comprises a rescheduling of combustion events. Dominant engine configuration for heavy duty truck diesels is the six cylinder in-line. This conventional engine has a power stroke and exhaust "blow-down" process at each 120 degrees of crank rotation as shown in FIG. 10A (the Revolutions are marked at 0, 1 and 2 increments). When the cylinder exhaust valve opens, a rush of gas is discharged from the cylinder. This rapid "blow-down" sustains turbo charger speed, which is not attainable on an average mass flow basis. Hence, at low engine speeds turbo speed is largely maintained by the energy of these blown-down events.

Figure 10B:
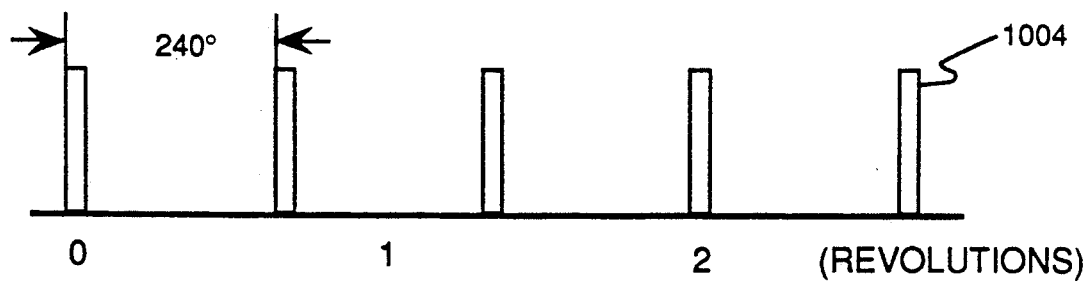

This effect can be exaggerated by having two cylinders blowing down at the same time. The instant invention's above described independent control of valve and injector timing between cylinders can also be used to switch valves into SFM. In SFM, two cylinders are fired at the same time. After waiting double the normal interval, two more cylinders are fired. The SFM firing sequence is shown in FIG. 10B. In both FIGS. 10A and 10B, the narrow rectangles 1002 and 1004 represent energy transferred to the crank shaft. SFM results in higher turbocharger speed at low engine speed. The firing order or sequence is controlled to help transient response at low engine speeds.

While various embodiments of the instant invention have been described above, it should be understood that they have been presented by way of example, and not limitation. Thus the breadth and scope of the instant invention should not be limited by any of the above-described exemplary embodiments, but should be defined in accordance with the following claims and their equivalence.

What is claimed is:

1. A system for controlling a plurality of operational modes of an engine including valve and injection events, in which the engine comprises a plurality of cylinders having an intake and exhaust valve, an injector, a chamber and an intake and exhaust port, wherein the plurality of cylinders are connected by an intake and exhaust manifold, said system comprising:

cylinder control means for governing an operational mode of each of the cylinders independently, including:

(a) valve control means for controlling the operation of the intake and exhaust valves, including controlling at least one of an opening and closing of the intake and exhaust valves in accordance with the independently governed operational mode of each cylinder; and (b) injector control means for controlling the operation of each of the injectors, including controlling fuel injection timing of each of the injectors, independently of the operation of the intake and exhaust valves;

wherein said cylinder control means independently controls each of the cylinders to control the valve and injection events to responsively achieve a plurality of operational modes for the engine.

2. A method for controlling a plurality of operational modes of an engine including valve and injection events, in which the engine comprises a plurality of cylinders having an intake and exhaust valve, an injector, a chamber and an intake and exhaust port, wherein the plurality of cylinders are connected by an intake and exhaust manifold, said method comprising the steps of:

controlling, independently, a mode of operation for each of the cylinders by:

controlling at least one of an opening and closing of the intake and exhaust valves of a given cylinder independently of the operation of the intake and exhaust valves of the others of said plurality of cylinders; and controlling fuel injection timing of the injector of said given cylinder independently of the opening and closing of the intake and exhaust valves of said given cylinder and of the operation of the injection of said other cylinders.

3. A method for controlling valve and injection events for an engine according to claim 2, further comprising the step of:

controlling the timing of said opening and closing of the intake and exhaust valves to control engine braking.

4. A method for controlling valve and injection events for faster upshifting of an engine according to claim 3, further comprising the step of:

placing the engine in a first operational load mode; and switching at least one of the plurality of cylinders into a braking mode for reducing engine RPMs to permit instantaneous synchronous upshifting.

5. A method for controlling valve and injection events for an engine according to claim 2, further comprising the step of:

modifying said timing of said fuel injection to achieve split injection to reduce engine stress and noise.

6. A method to reduce the effective induction and compression strokes of the engine and achieve a modified engine air flow and compression ratio of an engine according to claim 2, further comprising the step of:

modifying the intake closing of the engine by performing one of:

(a) closing the intake valve during a late stage of an induction stroke; and (b) closing the intake valve during an early stage of a compression stroke.

7. A method for controlling valve and injection events for an engine according to claim 2, further comprising the steps of:

opening the intake valve of at least one of the plurality of cylinders to draw air in through the corresponding intake port during an induction stroke of a cycle of the engine;

thereafter closing the intake valve; and thereafter opening the exhaust valve during a compression stroke of said cycle to pump air through the exhaust port to operate the engine as a positive displacement pump.

8. A method for controlling valve and injection events for starting an engine according to claim 2, further comprising the steps of:

(1) placing the plurality of cylinders into a low work mode to permit low torque engine cranking;

(2) placing a subset of said plurality of cylinders into a first drag mode to inhibit air flow into a corresponding plurality of chambers;

(3) switching at least one cylinder into an air heating mode to heat air in a corresponding intake manifold and a corresponding chamber;

(4) switching said at least one cylinder into a normal operating mode;

(5) switching said plurality of cylinders into a second drag mode higher that said first drag mode;

(6) increasing fuel injection to said at least one cylinder to induce strong heating; and (7) starting further cylinders by repeating steps 3-6.

9. A method for controlling valve and injection events for optimizing part load of an engine according to claim 2, further comprising the steps of:

placing at least one first cylinder into a high load mode; and placing at least one second cylinder into a low drag mode to improve engine efficiency.

10. A method for controlling valve and injection events for fast engine response according to claim 2, further comprising the steps of:

(1) placing at least one first cylinder into a braking mode to absorb power and placing at least one second cylinder into a high load mode to increase exhaust temperature and provide a surplus of turbocharged air;

(2) conveying said surplus of turbocharged air to said at least one first cylinder; and (3) switching said at least one first cylinder into a power mode to exploit said surplus of turbocharged air to improve engine response.

11. A method for controlling valve and injection events for an engine according to claim 2, further comprising the steps of:

placing the plurality of cylinders into a first mode of cycle operation; and switching at least one of said plurality of cylinders into a second mode of cycle operation, said first mode of cycle operation being different from said second mode of cycle operation.

12. An internal combustion engine adapted to perform a plurality of operational modes including a combination of independent cylinder events, wherein said engine comprises:

a plurality of cylinders, connected by an intake and exhaust manifold, each cylinder comprising an intake and exhaust valve, an injector, a chamber, an intake and exhaust port;

means for governing at least a first cylinder of said plurality of cylinders in a first operational mode, wherein said first operational mode has a first ordered set of cylinder events; and means for independently governing at least a second cylinder of said plurality of cylinders in a second operational mode, wherein said second operational mode has a second ordered set of cylinder events;

wherein said first ordered set of cylinder events is different from said second ordered set of cylinder events.

13. A method for controlling simultaneous firing of a plurality of cylinders of an internal combustion engine by scheduling of combustion events, comprising the steps of:

(1) placing two cylinders in a firing mode to cause substantially simultaneous blow-down;

(2) waiting approximately 240° of crank shaft rotation;

(3) placing two further cylinders in a firing mode to cause additional substantially simultaneous blow-down; and (4) repeating steps 2 and 3 to increase turbocharger speed at low engine speed.

* * * * *